Sept. 27, 1966    P. MURAKAMI    3,274,732
CAR DOOR ACTUATOR DEVICE

Filed Aug. 24, 1964    3 Sheets-Sheet 1

INVENTOR
Paul MURAKAMI

ATTORNEYS

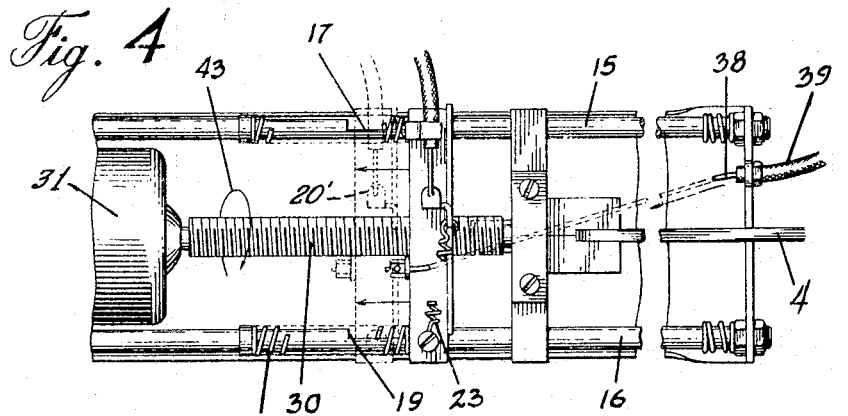
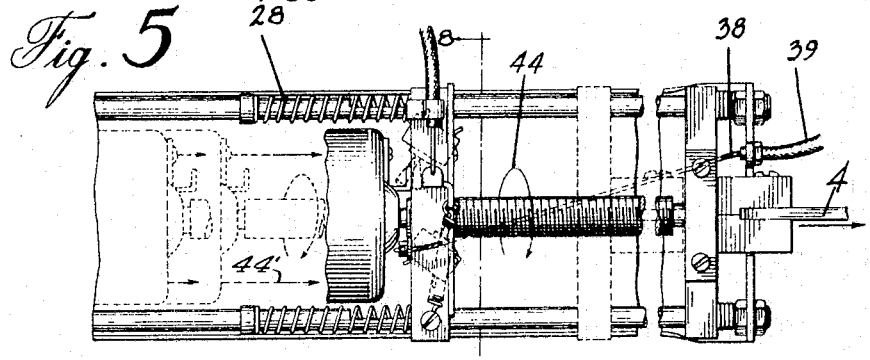
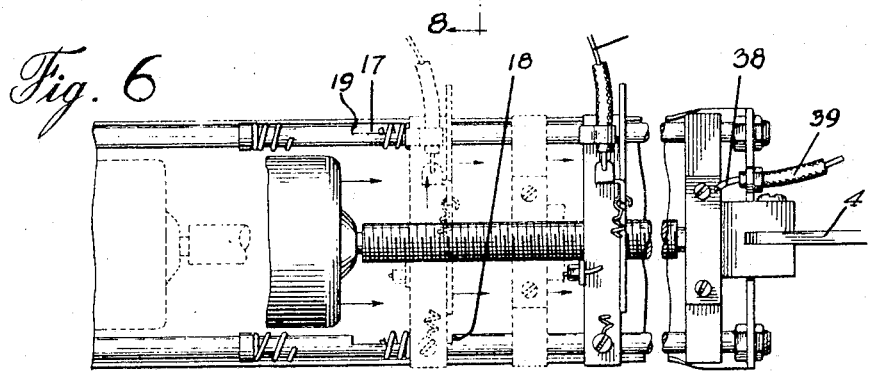
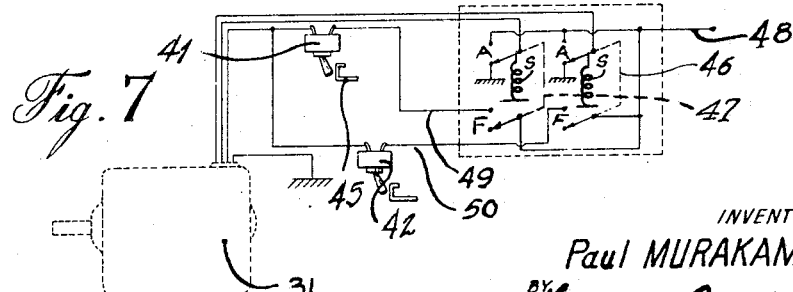

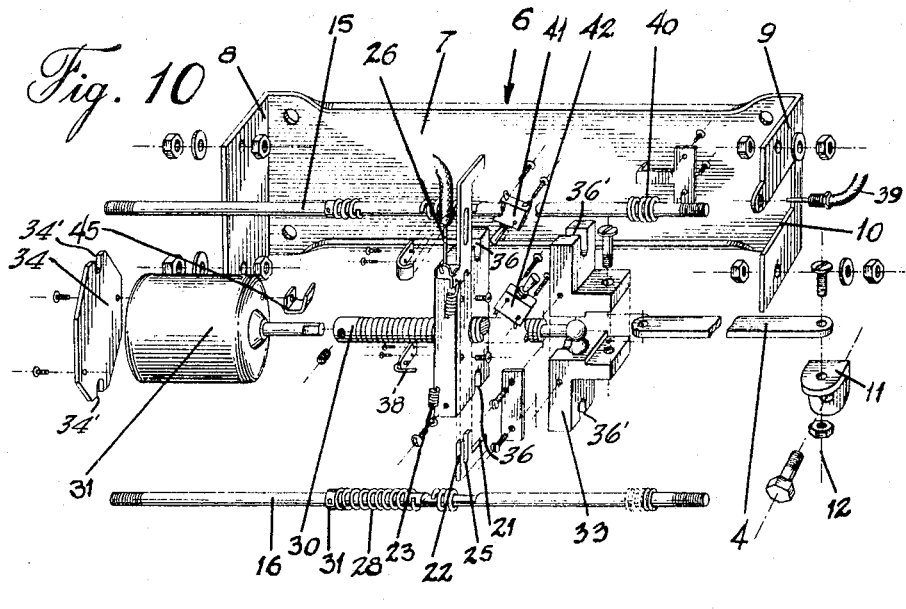
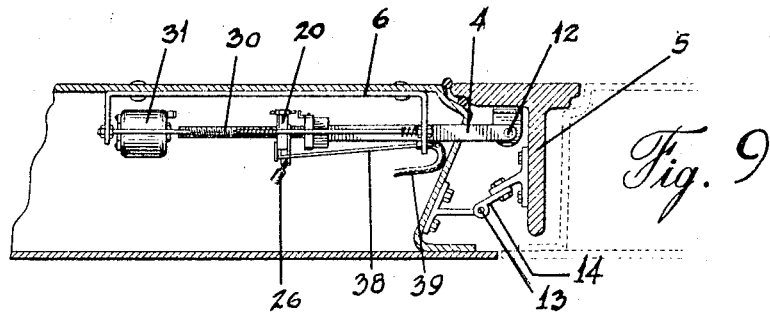
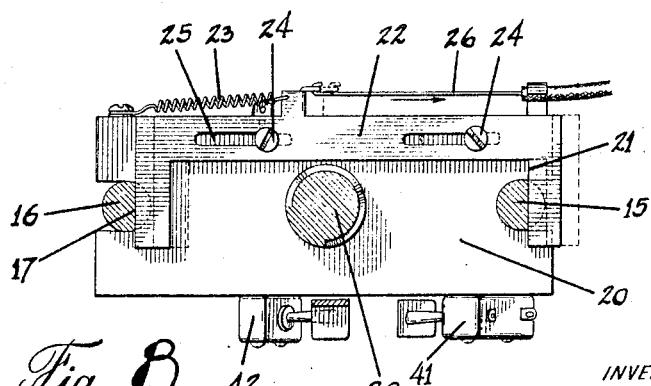

United States Patent Office 3,274,732
Patented Sept. 27, 1966

3,274,732
CAR DOOR ACTUATOR DEVICE
Paul Murakami, 10206 Armand Lavergne, Montreal, Quebec, Canada
Filed Aug. 24, 1964, Ser. No. 391,452
2 Claims. (Cl. 49—280)

The invention relates to an improvement in automotive bodies and particularly to an improved mechanism for operating the door of an automobile or the like, automatically, by simple switch button pressing.

The invention therefore relates to a mechanized device for operating the doors of a car without any actual physical handling of same. The foremost advantage of the device of the invention is that it makes it possible for the driver of a car or other road vehicle to have at his fingertip the complete control of all the doors of his vehicle at all times, thereby resulting in the complete removal of the door controls from the passengers, i.e., the usual control which every passenger usually has over the operation of the closest door. The device of the invention therefore makes it possible to completely eliminate the inside door handles, which, in itself is a highly desirable safety factor in that it lessens the risk of accidents such as are often caused by unintentional tripping of the inside door handle by a passenger while the vehicle is in motion.

For the driver of a vehicle, particularly one in which children are riding, the knowledge that he alone has control over all the doors of his vehicle is a significant advantage in that it frees his mind of the constant fear of such accidents happening. Because of the invention, the driver of the vehicle is therefore capable of giving fuller attention to his driving and less to what is happening around him inside the vehicle.

Through the invention there also results an advantage which is to be appreciated by taxi drivers: by keeping full control over the doors of their vehicles, such as by means of the invention, the drivers ensure that their passengers will not walk away without having first paid their fare. In a lighter vein perhaps, there is another advantage of the invention which is apt to be appreciated by those drivers who might find it slightly inconvenient to abide by the rule of etiquette that requires the polite driver to step out of the vehicle and walk fully around it in order to open the door for lady passengers, older persons and dignitaries.

Mechanically, the invention relates to an electrically driven mechanism whereby the rotary motion of an electric motor is translated into a linear motion relatively to the door itself and at right angle to the hinge axis or line of the door hinges; the said linear motion being communicated to one end of a connector, the other end of which is connected to the door post at a point which is inwardly offset with respect to the hinge line or axis of the door.

The device or mechanism is so designed that, for added safety and convenience, it enables one to release the mechanism and open the door manually from the outside. The device or mechanism also has the advantage of being easily adaptable to almost any door of any car with a minimum of necessary adjustment at the time of installation and without the need for substituting for the existing latch mechanisms and locks. By communicating the linear motion of a component of the mechanism of the invention to the latch mechanism by means of control cables and appropriate levers, the door is automatically unlatched or latched depending on whether it is to open or to close.

The foregoing and yet other advantages of the invention will be better understood from the following disclosure of an embodiment and in reference to the drawing, wherein:

FIGS. 4, 5 and 6 are fractional side elevations of a powered car door opening and closing device wherein the mechanism is shown in various stages of operation;

FIG. 7 is a schematic diagram of a preferred circuit for use in connection with the door opening and closing device of the invention;

FIG. 8 is a sectional view taken along line 8—8 of FIG. 5;

FIG. 9 is a horizontal sectional view through a typical rear door mount of a car and looking down on a typical installation of the invention;

FIG. 10 is an exploded view, in perspective, of an electric, motor driven car opening and closing mechanism in accordance with the invention.

Figure 1:
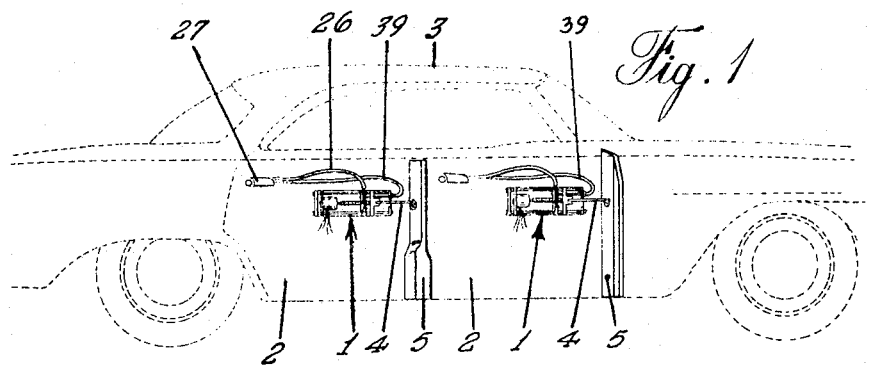
FIG. 1 is a side elevation of a car, the profile of which is shown in dotted lines and wherein installations in accordance with the invention are shown as would be viewed by transparency through the door panels.
Figure 2:
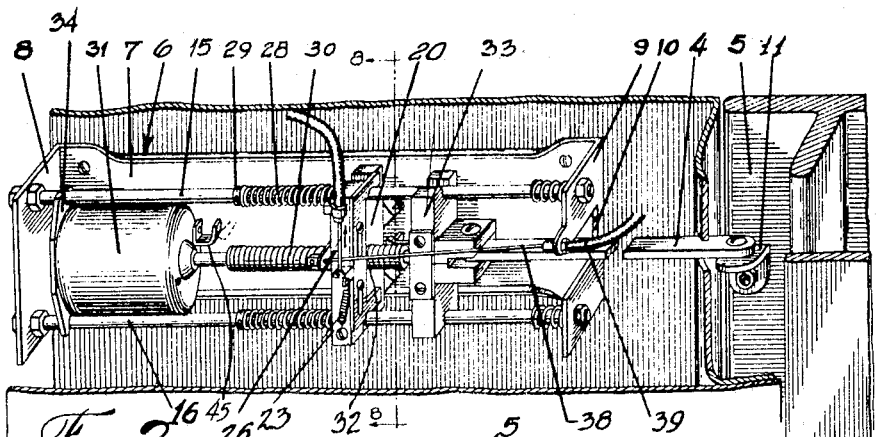
FIG. 2 is a sectional view in perspective through a car door and shows a typical installation of the door opening and closing device in accordance with the invention.
Figure 3:
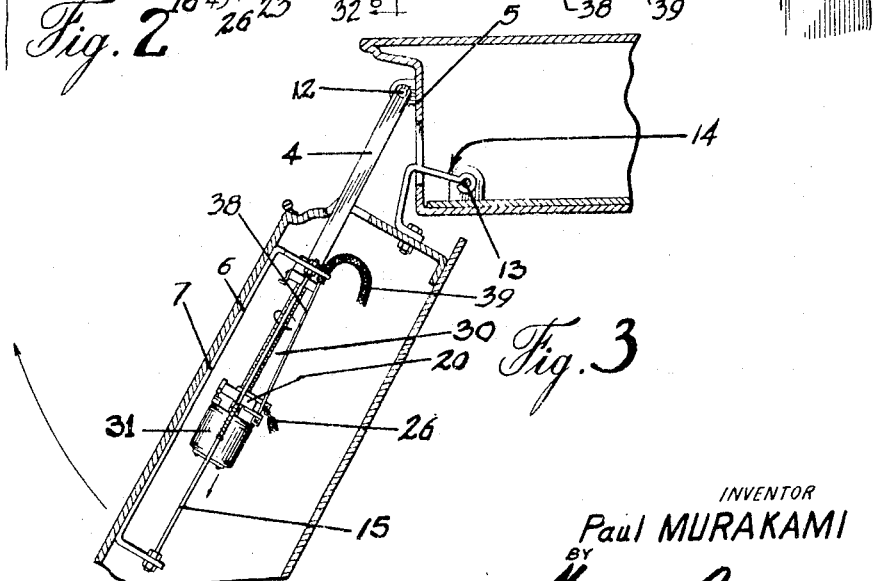
FIG. 3 is a horizontal section through the portions of a car door and car body adjacent to the hinge thereof, the section being taken immediately above and looking down on a car door opening and closing device typical of the invention, the door being shown open.

In FIG. 1, it is shown that a door actuator 1 is installed inside each door 2 of a car 3, the unessential profile of which is shown in dotted lines. Each device is entirely contained inside a hollow door 2 with the exception of the connector 4 which projects through and beyond the hinge end of the door 2 and is in turn connected to a door post 5 at a point thereof which is inwardly located with respect to the hinge line or axis 13 of the door, as shown in FIG. 2 and subsequent figures of the drawing. The mechanical details of the door actuator are better observed in FIGS. 2, 4, 5, 6 and 10 wherein it is shown that it consists of a mounting bracket 6 presenting a base plate 7 and two end plates 8 and 9, the latter presenting a U-shaped slot 10 through which projects the connector 4; the post bracket 11 is secured to the door post or jamb 5 and connector 4 is secured thereto for rotation about an axis 12 thereof. The axis 12 is selected to lie a short distance inwardly from the axis 13 of the door hinges 14.

Spaced apart and parallel guide rods 15 and 16 form a track on which the moving components are mounted for longitudinal displacement therealong. The rods 15 and 16 are secured to the end plates 8 and 9 and span the full distance between them.

Each guide rod 15 and 16 has an intermediate flat land or depression 17 between the square ends 18 and 19 of which a drawer or nut block 20, slidable on said rods, is limited in its displacement by means of edges 21 of a latch bridge 22 engaging the depressions 17 under the action of a spring 23. The latch bridge is slidably secured to the nut block 20 by means of screws 24 and slotted holes 25 of said bridge. A control cable 26 suitably connected to the bridge 22 and to an outside door handle 27 is designed for transmitting from the handle to the bridge 22 sufficient pull to counteract spring 23 and unlatch the edges 21, thereby freeing the nut block from the restraint of the depression 17; the effect of unlatching the nut block in this manner is to free the mechanism for manual handling of the door in the conventional manner.

Coil springs 28, working under compression between a collar 29 on each of rods 15 and 16 and the surface of the nut block 20, constantly urge the latter toward and against the square end 18 of the flat land 17.

A long screw shaft 30, driven by an electrical motor 31 and parallel to the rods 15 and 16, meshes through a correspondingly threaded hole 32 of the drawer or block 20 and, is secured for rotation in a bearing block 33. The motor 31 is located between the rods 15 and 16 and mounted slidably with respect thereto by means of a back plate 34, the opposite U-shaped cuts 34' of which engage the rods 15 and 16. The drawer or nut block 20 and the bearing block 33 slidably engage the rods 15 and 16 by means of similar oppositely directed U-shaped cuts 36 and 36' respectively. The connector link 4 is attached to the bearing block 33.

A control cable 38 is connected to the nut block 20 and to the latch mechanism of the door whereas the stationary sleeve 39 of the cable 38 is secured to the end plate 9 at one end and to a fixed portion of the latch mechanism at the other.

Appropriate cushioning springs 40 are provided on the rods 15 and 16.

Limit switches 41 and 42 are secured to the nut block 20 for the purpose of switching off the motor when the door is fully opened in one instance and when it is fully closed in the other.

Assuming that the mechanism is switched on for opening the door when it is closed as shown in FIG. 4, it is readily appreciated that, the door being latched, as the screw 30 is driven into rotation in the direction shown by arrow 43 it progresses through the nut block 20, but, there being forces resisting motion of the screw relative to the door itself, instead, the nut block 20 is caused to back up against the pressure of the springs 28 as shown by the dotted profile 20' of the nut block shown in FIG. 4. As the nut block retreats to a position 20' the control cable 38 is being pulled thereby causing the eventual unlatching of the door; the nut block is then allowed to resume its original position while the assembly of the motor, screw and bearing block is pushed forward in the direction of arrow 44' under the influence of the energy accumulated in the springs 28, at first, and the continued rotation of the screw in the nut block. As the motor 31 approaches the nut block 20, a clip 45 engages the limit switch 41, thereby switching off the electrical power to the motor.

A preferred circuit for connecting the device is shown on FIG. 7, wherein it is seen that operator switches 46 and 47 control the opening and the closing of the door respectively and are on separate parallel branches of the live line 48. Limit switch 41 is series connected on branch 49 of switch 47 whereas switch 42 is series connected on branch 50 of switch 46.

Switches 46 and 47 are double pole double throw switches which snap back to their inoperative positions by means of return springs S as shown on the diagram of FIG. 7. Poles 46A and 47A control the current to the armature and manual actuation of one of switches 46 or 47 will send current through the armature of the motor in one direction whereas manual actuation of the other switch 47 or 46 will send current through the armature in the opposite direction. Field currents are controlled by the poles 46F and/or 47F of the switches 46 and 47 respectively. The field currents are not reversed and the return always takes place through the ground connection G of the motor.

Switch 47 is for opening the door, an operation that continues for as long as the switch 47 is activated and which is automatically stopped when the door is fully open and the limit switch 42 is engaged or actuated by the clip 45.

Switches 46 and 47 are the switches which are disposed on a door control panel within easy reach of the car operator or, if preferred, on a control panel located near each door but preferably not on the door itself.

I claim:

1. An actuator for operating a vehicle's door having a door latch mechanism, particularly a thick hollow door having an inner wall and an outer wall and hingedly secured to an adjacent part of said vehicle for rotation relatively thereto about a hinge axis located near one edge of said door and close to the outer wall thereof, said actuator being located between the walls and comprising a straight track at right angle to the hinge axis and secured to one of said walls, a nut block slidably mounted on said track; a reversible electric motor slidably mounted on said track and having a long screw threaded shaft parallel to said track and projecting through a correspondingly threaded hole across said nut block; a bearing block slidably mounted on said track; said shaft terminating into said bearing block for simultaneous axial displacement therewith and free rotation therein; a connector rod secured at one end to said bearing block and freely rotatable about an axis essentially parallel to the hinge axis and similarly at the other end thereof to an adjacent part of said vehicle at a point thereof which is inwardly offset from the hinge axis of the door; cooperating means on said nut block and track to limit the displacement of said nut block on said track; spring means urging said nut block in the direction of said bearing block, and a cable connected to the said nut block and to the door latch mechanism; any displacement of said nut block against the action of said spring means being transmitted by said cable to the latch mechanism so as to cause unlatching of said door.

2. An actuator for operating a vehicle's door as claimed in claim 1 wherein said cooperating means include a releasable latch device resiliently biassed in latching position; a pull cable connected to a door handle mechanism of said vehicle and to said latch device, so constructed and arranged that operation of said door handle mechanism causes release of said latch device through said pull cable for free sliding of said nut block on said track.

References Cited by the Examiner

UNITED STATES PATENTS 2,256,613 9/1941 Forman et al. _____ 268—65
3,202,414 8/1965 Simmons et al. _____ 268—3

HARRISON R. MOSELEY, *Primary Examiner.*

J. K. BELL, *Assistant Examiner.*